United States Patent
Lewis

(10) Patent No.: US 6,920,566 B2
(45) Date of Patent: Jul. 19, 2005

(54) SECURE SYSTEM FIRMWARE BY DISABLING READ ACCESS TO FIRMWARE ROM

(75) Inventor: Timothy A. Lewis, El Dorado Hills, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 0 days.

(21) Appl. No.: 10/194,857

(22) Filed: Jul. 12, 2002

(65) Prior Publication Data

US 2004/0010702 A1 Jan. 15, 2004

(51) Int. Cl.⁷ .............................................. G06F 12/14
(52) U.S. Cl. ...................... 713/194; 713/193; 711/163
(58) Field of Search ................................ 713/193–194; 711/163

(56) References Cited

U.S. PATENT DOCUMENTS

| | | | | |
|---|---|---|---|---|
| 4,583,196 A | * | 4/1986 | Koo | 713/200 |
| 5,058,164 A | * | 10/1991 | Elmer et al. | 713/190 |
| 5,446,864 A | * | 8/1995 | Burghardt et al. | 711/100 |
| 5,511,184 A | * | 4/1996 | Lin | 710/261 |
| 6,138,240 A | * | 10/2000 | Tran et al. | 713/202 |

* cited by examiner

*Primary Examiner*—Andrew Caldwell
*Assistant Examiner*—Minh Dieu Nguyen

(57) ABSTRACT

Systems, methods and software that use a programmable lock bit that disables read access to a firmware ROM until the CPU is reset or enters into a secure CPU mode. The present invention provides for secure system firmware by preventing access to and reading of the contents of the firmware ROM.

17 Claims, 2 Drawing Sheets

SECURE SYSTEM FIRMWARE BY DISABLING READ ACCESS TO FIRMWARE ROM

BACKGROUND

The present invention relates generally to computer systems and firmware, and more particularly, to the use of a programmable lock bit for firmware ROM which disables read access until CPU reset or entry to a secure CPU mode, thus providing for secure system firmware.

The prior art relating to the present invention generally falls into two categories. The first category involves preventing write-access to the firmware ROM, either through lock bits or by generating some type of interrupt when access is attempted. For example, Intel ICHx chips contain configuration bits that enable the generation of a System Management Interrupt (SMI) when attempts to write to the firmware ROM are made.

With regard to the first category, there is no attempt to prevent reading the contents of the firmware ROM. Thus, the firmware ROM is safe from tampering, but not safe from prying eyes.

The second involves preventing read and write access to the firmware ROM by modification of a read/write configuration bit. Examples include the Intel ICHx chips which contain read/write configuration bits which determine whether attempts to read the firmware ROM will access the ROM or be ignored.

With regard to the second category, there is no attempt to "lock" the configuration bits, which allows the contents of the firmware ROM to be accessed simply by modifying the configuration bits.

There is also known prior art controlling access to various areas of RAM, including readability.

The prior art is generally concerned about the modification of the firmware ROM or about modification of the contents of shadow RAM. While some prior art (i.e., the ICHx configuration bits) does allow reading of the firmware ROM to be disabled, any malicious program could, using publicly available information, enable the ROM again.

It is therefore an objective of the present invention is to provide for computer systems, methods and software that provide for secure system firmware using a programmable lock bit.

SUMMARY OF THE INVENTION

To accomplish the above and other objectives, the present invention provides for systems, methods and software that use a programmable lock bit that disables read access to a firmware ROM until the CPU is reset or enters into a secure CPU mode. The present invention provides for secure system firmware by preventing access to and reading of the contents of the firmware ROM.

An embodiment of the present invention comprises a central processing unit (CPU) and a firmware read only memory (ROM) coupled to the CPU that stores firmware of the system. Lock logic programmatically locks an enable/disable configuration bit so that it cannot be changed once it is set. Detect logic detects read accesses to the firmware ROM and returns a predetermined value instead of the contents of the firmware ROM, or that acts as if the firmware ROM is not present. Unlock logic unlocks the enable/disable configuration bit so that it can be set once a system reset is detected. Ignore logic ignores the status of the enable/disable configuration bit when the CPU is in a predetermined operating mode. Software is provided that asserts the lock bit prior to transferring control of the system from the system firmware to the operating system.

In implementing the present invention, the firmware is executed when the system is reset. Hardware of the system is tested and initialized. A run time environment used by an operating system is initialized. A configuration bit is then set that prevents access to the firmware ROM unless the system is in a predetermined secure operating mode prior to a time when control of the system is to be transferred from the system firmware to the operating system. Control of the system is then transferred from the system firmware to the operating system.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which.

DETAILED DESCRIPTION

Figure 1:
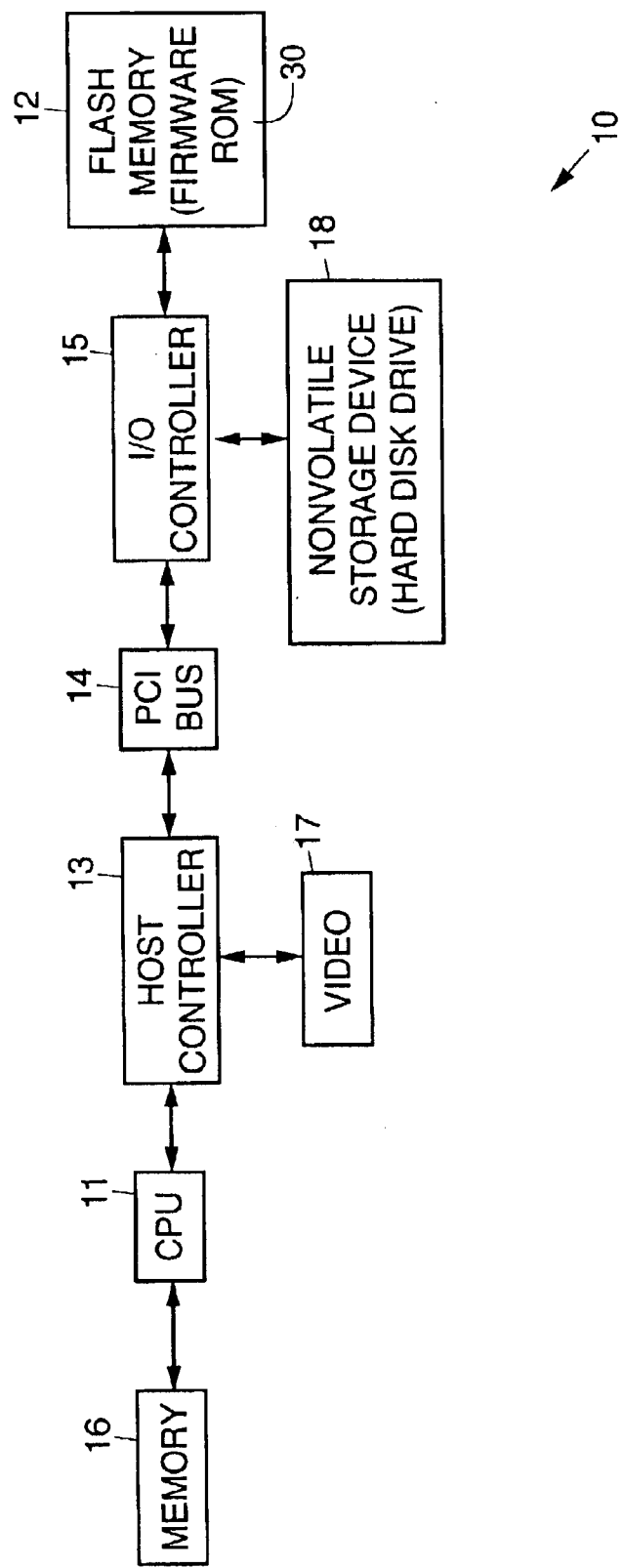
FIG. 1 is a block diagram illustrating an exemplary system implemented in accordance with the principles of the present invention.

Refering to the drawings FIG. 1 is a block diagram illustrating an exemplary computer system 10, such as a personal computer system that provides for secure firmware 30 using apparatus, methods and software in accordance with the principles of the present invention. The computer system 10 comprises a central processing unit (CPU) 11 that is coupled by way of a host controller 13, a system bus 14, such as a Peripheral Component Interconnect (PCI) bus, for example, and an I/O controller 15 to a critical nonvolatile storage device 12, primarily referred to herein as a firmware read only memory (ROM) 12.

The critical nonvolatile storage device 12 may by flash memory, a read only memory (ROM), a programmable read only memory (PROM), an erasable programmable read only memory (EPROM), art electrically erasable programmable read only memory (EEPROM), or other device or technology that the CPU 11 can use to execute an initial set of instructions. The initial set of instructions, or code, comprises system firmware 30 including a basic input/output system (BIOS).

The CPU 11 is also coupled to a system memory 16, such as a random access memory 16. The CPU 11 is also coupled by way of the host controller 15 to video control circuitry 17 that is used with a video monitor.

The CPU 11 may be coupled to a secondary nonvolatile storage device 18 by way of the system PCI bus 14, and the I/O controller 15. The secondary nonvolatile storage device 18 may be a hard disk drive, a compact disk (CD) drive, a digital video disk (DVD) drive, a floppy disk drive, a high density floppy disk (HiFD) drive, flash memory, read only memory (ROM), programmable read only memory (PROM), erasable programmable read only memory (EPROM), electrically erasable programmable read only memory (EEPROM), or any other device or technology capable of preserving data in the event of a power-off condition.

A first portion of the critical nonvolatile storage device 12 stores initialization code that is operative to initializes the CPU 11 and the system memory 16. A second portion of the critical nonvolatile storage device 12 stores a dispatch manager that contains a list of tasks, which must execute to fully initialize the computer system 10. The dispatch manager is operative to selectively load and iteratively execute a number of tasks relating to complete initialization of the computer.

In operation, when the computer system 10 is turned on, the initialization code 30 (BIOS 30) is run to initialize the CPU 11 and the system memory 16. The dispatch manager is then loaded into the system memory 16. The dispatch manager executes the list of tasks contained therein to cause all required firmware 30 (BIOS modules 30) to be loaded into the system memory 16 and must be executed.

The dispatch manager determines whether each requires BIOS module 30 is in the system memory 16, and if it is not, finds, loads and executes each required BIOS module 30. The BIOS modules 30 may be located in the critical nonvolatile storage device 12 (flash memory) or in the secondary nonvolatile storage device 18, including any of the critical or secondary nonvolatile storage devices 18 identified above.

Figure 2:
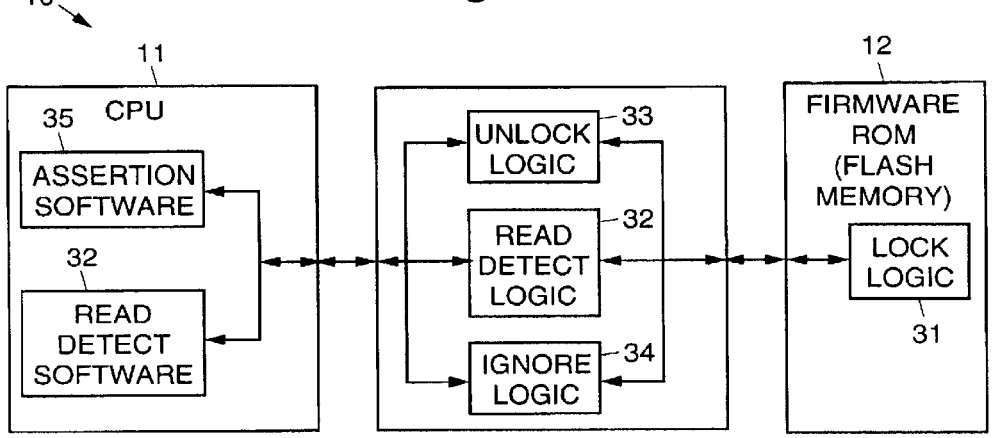
FIG. 2 is a block diagram illustrating a logical representation of an exemplary embodiment of the present invention.

FIG. 2 is a block diagram illustrating a logical representation of the present invention. As is shown in FIG. 2, the present invention logically comprises the following components.

A firmware read only memory (ROM) 12 (or flash part 12) is provided which is an area that stores code, including system firmware 30 comprising the initialization code 30 or BIOS 30, that is normally accessible by the CPU 11. Lock logic 31 that is part of the hardware programmatically locks an enable/disable configuration bit so that it cannot be changed once it is set.

Detect logic 32 is part of the hardware of the system 10 that detects read accesses to the firmware ROM 12 and returns a predetermined value instead of the contents of the firmware ROM 12, or that acts as if the firmware ROM 12 is not present. Optionally, read detect code may be provided as part of the software used to implement the present invention. Unlock logic 33 that is part of the hardware of the system 10 unlocks the enable/disable configuration bit so that it can be set once reset is detected.

Ignore logic 34 is part of the hardware of the system 10 that ignores the status of the enable/disable configuration bit when the CPU 11 is in a predetermined secure operating mode, such as system management mode. Software 35 (that runs on the CPU 11) is provided that asserts the configuration bit. Assertion of the lock bit is usually performed prior to invoking a non-secure environment, such as a general-purpose operating system.

Figure 3:
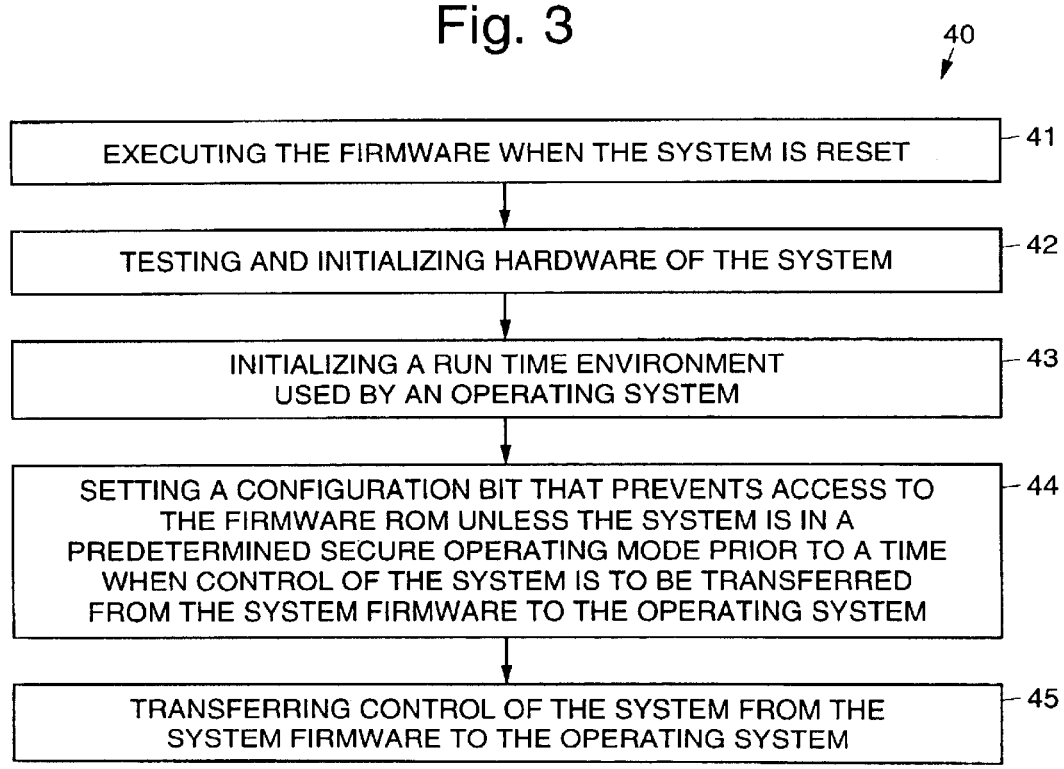
FIG. 3 is a flow diagram illustrating an exemplary method and software in accordance with the principles of the present invention.

FIG. 3 is a flow diagram illustrating an exemplary method 40 and software in accordance with the principles of the present invention. The exemplary method 40 comprises the following steps.

The CPU 11 begins executing 41 the system firmware 30 when the system 10 is reset (upon the occurrence of a reset vector). The system firmware 30 tests and initializes 42 hardware of the system 10 (a power-on self-test (POST) procedure) and initializes 43 a run time environment used by an operating system.

The system firmware 30 sets 44 a configuration bit immediately prior to the time when control of the system 10 is handed off 45 or transferred 45 from the system firmware 30 to the operating system. The configuration bit controls access to the firmware ROM 12 containing the system firmware 30. Setting of the configuration bit prevents access to the firmware ROM 12 unless the system 10 is in a predetermined secure operating mode. Control of the system 10 is then transferred 45 from the system firmware 30 to the operating system.

The configuration bit, once set, prevents access by the CPU 11 to the contents of the firmware ROM 12 until the system 10 is reset or, optionally, until the system 10 enters a secure operating mode, such as system management mode. Attempts to read the contents of the firmware ROM 12 can optionally return a predetermined value or undefined values. This prevents malicious programs from trying to determine sensitive information stored in the firmware ROM 12.

The present invention thus uses a programmable "lock" bit to disable read access of the firmware ROM 12 until the CPU 11 is reset or enters to a secure CPU mode. The present invention prevents any access to the firmware ROM 12 except that which is specifically allowed by the firmware (BIOS), either by leaving certain portions "readable" or by copying the necessary information to another area of memory.

Alternative embodiments of the present invention may include the following. (1) A plurality of locations in firmware ROM 12 may be provided for different sectors. (2) A plurality of configuration (lock) bits may be used. A number of lock bits equivalent to the number of ROM locations is preferred. (3) Different "reset" signals may be monitored. In general, signals that force the CPU 11 to begin execution at its default execution address are the ones that should unlock the read-control configuration bit. (4) Generation of an SMI may occur only on attempts to read, or generation of a default value may occur only on attempts to read, or both.

(5) Different points of execution within the power-on self-test code may be chosen for asserting the lock configuration bit. If security against attacks using "option ROMs" is employed, then an earlier point in time to set 44 a configuration bit may be chosen. If the physical platform is assumed to be reasonably secure, or provides no place for expansion cards, then the point in time to set 44 a configuration bit can be significantly later in the power-on self-test process. The latter is generally preferred because it places fewer restrictions on the ability of the power-on self-test code to use the contents of the firmware ROM 12.

Thus, systems, methods and software that provide for secure system firmware using a programmable lock bit have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A system that provides for secure system firmware, comprising:

a central processing unit (CPU);

a firmware read only memory (ROM) coupled to the CPU that stores firmware of the system;

lock logic that programmatically locks an enable/disable configuration bit so that it cannot be changed once it is set;

detect logic that detects read accesses to the firmware ROM and returns a predetermined value instead of the contents of the firmware ROM, or that acts as if the firmware ROM is not present;

unlock logic that unlocks the enable/disable configuration bit so that it can be set once a system reset is detected;

ignore logic that ignores the status of the enable/disable configuration bit when the CPU is in a predetermined operating mode; and software that asserts the lock bit.

2. The system recited in claim 1 wherein the software asserts the lock bit prior to invoking a non-secure environment.

3. The system recited in claim 2 wherein the non-secure environment comprises a general-purpose operating system.

4. The system recited in claim 1 wherein the configuration bit comprises a plurality of configuration bits.

5. A method that provides for secure firmware in a system having a central processing unit (CPU) and a firmware read only memory (ROM) coupled to the CPU that stores system firmware, comprising:

setting a configuration bit that prevents read access to the firmware ROM unless the system is in a predetermined secure operating mode prior to a time when control of the system is to be transferred from the system firmware to an operating system; and transferring control of the system from the system firmware to the operating system.

6. The method recited in claim 5 wherein the configuration bit, once set, prevents read access by the CPU to the contents of the firmware ROM until the system is reset.

7. The method recited in claim 5 wherein the configuration bit, once set, prevents read access by the CPU to the contents of the firmware ROM until the system enters a secure operating mode.

8. The method recited in claim 7 wherein the secure operating mode comprises system management mode.

9. The method recited in claim 5 wherein attempts to read the contents of the firmware ROM returns a predetermined value or an undefined value.

10. Apparatus, that provides for secure system firmware in a system including a central processing unit (CPU) and a firmware read only memory (ROM) coupled to the CPU that stores the system firmware, comprising:

detecting means for detecting read access to the firmware ROM and returns a predetermined value instead of the contents of the firmware ROM, or that acts as if the firmware ROM is not present;

unlock logic that unlocks an enable/disable configuration bit so that it can be set once a system reset is detected;

ignore logic that ignores the status of the enable/disable configuration bit when the CPU is in a predetermined operating mode; and software comprising:
 a code segment that executes the firmware when the system is reset;
 a code segment that tests and initializes hardware of the system;
 a code segment that initializes a run time environment used by an operating system;
 a code segment that asserts the configuration bit to prevent access to the firmware ROM unless the system is in a predetermined secure operating mode; and
 a code segment that transfers control of the system from the system firmware to the operating system.

11. The apparatus recited in claim 10 wherein the detecting means comprises:

detect logic that detects read accesses to the firmware ROM and returns a predetermined value instead of the contents of the firmware ROM, or that acts as if the firmware ROM is not present.

12. The apparatus recited in claim 10 wherein the detecting means comprises:

a code segment that detects read accesses to the firmware ROM and returns a predetermined value instead of the contents of the firmware ROM, or that acts as if the firmware ROM is not present.

13. The apparatus recited in claim 10 wherein the secure operating mode comprises system management mode.

14. A system, comprising: a processor;

nonvolatile memory, coupled to the processor, including instructions that when executed by the processor, cause the processor to:
 lock an enable/disable configuration bit so that it cannot be changed once it is set,
 detect read accesses to the nonvolatile memory and return a predetermined value instead of the contents of the nonvolatile memory, or act as if the nonvolatile memory is not present,
 unlock the enable/disable configuration bit so that it can be set once a system reset is detected,
 ignore the status of the enable/disable configuration bit when the CPU is in a predetermined operating mode, and
 assert the lock bit.

15. The system of claim 14, wherein the instructions cause the processor to assert the lock bit prior to invoking a non-secure environment.

16. The system of claim 15, wherein the non-secure environment further includes a general-purpose operating system.

17. The system of claim 14, wherein the configuration bit comprises a plurality of configuration bits.

* * * * *